United States Patent Office 3,117,062
Patented Jan. 7, 1964

3,117,062
PRODUCTION OF LYSINE
Harry Pearson Broquist, Champaign, Ill., John A. Brockman, Jr., Woodcliff Lake, N.J., and Arthur Van Buren Siffey, Pearl River, N.Y., assignors to American Cyanamid Company, New York, N.Y., a corporation of Maine
No Drawing. Filed Jan. 23, 1962, Ser. No. 168,223
10 Claims. (Cl. 195—30)

This invention relates to an improved method of producing l-lysine by the reaction of alpha-ketoadipic or alpha-hydroxyadipic acid with enzymes of yeast, and includes a new product high in free l-lysine.

Many foodstuffs, particularly those derived from cereal grains, contain proteins which are deficient in l-lysine. The animal body is not able to synthesize lysine and so when a food intake involves proteins which are deficient in l-lysine, an adequate balance for maintenance and growth of the animal body does not result. Thus it is necessary to supplement food either with proteins, such as animal proteins, which are high in l-lysine or by adding l-lysine itself.

Various yeasts have been used as food supplements but the yeasts, while they do contain some l-lysine, contain only small amounts, from 3% to 5%, in the protein of the yeast cells. The addition of yeast, therefore, to a food is not a complete answer to l-lysine deficiency.

Some interesting experimental work has been done on the growth of a number of microorganisms, including some yeasts by Freeland et al., Biochemical Journal, volume 41, pages 135–138. Freeland found that under her experimental conditions two yeasts had a certain amount of free lysine as well as lysine bound in the protein of the yeast itself. Freeland evaluated the two forms of lysine in terms of percentage of the total nitrogen found represented by free lysine and lysine in the yeast proteins. For Dutch top yeast it was 7.45% free l-lysine and 6.7% bound. In the case of Saacharomyces carlsbergensis the free l-lysine nitrogen was 3.3 and the protein bound nitrogen 8.97. As the amounts of the l-lysine set out in this application are in terms of percentage of dry solids weight Freeland's figures require recomputation using the percent of total nitrogen to total weight of yeast solids which, according to data given in U.S. Department of Agriculture Miscellaneous Publication 696, page 7, averages 7.71%. The nitrogen content of the l-lysine is 0.1916. As a result Freeland's figures must be multiplied by 7.71% and divided by 0.1916. This gives 3% of yeast solids free l-lysine for the Dutch top yeast and 1.2% for the other yeast. The corresponding percentages of l-lysine in the yeast proteins themselves are 3.05% for the Dutch top yeast and 3.6% for the other yeast.

Various theoretical studies have been made with tagged atoms of carbon 14 which show that the lysine in the protein of various microorganism, including a yeast, Torulopsis utilis, are derived preferentially from a mixture of alpha-ketoglutaric acid and acetic acid, in which latter the two carbon atoms are carbon 14. This description is to be found in an article by Bernard B. Davis, Advances in Enzymology, volume 16, pages 295–304. The actual work shows that the lysine in the yeast protein is derived from the acetic acid and the author postulates that the alpha-ketoglutaric and acetic acids form first alpha-ketoadipic acid and then alpha-aminoadipic acid which is transformed into l-lysine. The postulates are repeated in other recent articles. There is not, however, any information that the theoretically postulated chain of reaction takes place. All that the author knows is that the radio active carbon in the lysine of the yeast protein is derived from the acetic acid in the medium. This earlier description does not describe any improved process for producing l-lysine in large amounts. It merely shows that the lysine in the yeast protein itself derives from acetic acid which may or may not have passed through the stages of ketoadipic acid and aminoadipic acid.

The problem of producing a sufficiently rich source of lysine, which is several times greater than that present in yeast proteins, is solved under definite conditions when the enzymes of yeast cells react with either ketoadipic acid or hydroxyadipic acid. It makes little difference whether the enzymes are contained in yeast cells either resting or growing, or have actually been separated from the cells. This process produces good yields of free l-lysine, that is to say lysine which is not a part of the yeast protein itself, producing a total amount of l-lysine up to 20% of cell weight. After subtracting the lysine present in the protein of the yeast itself and amounting to 3% to 5%, there is up to 15% to 17% of free lysine. The amount of free lysine produced is easily determined by subtracting the "zero time analysis" of the medium itself from the total amount of lysine found in the liquid separated from the yeast proteins. This is a measure of the free lysine obtained by reaction of alpha-ketoadipic or alpha-hydroxyadipic acid with the yeast enzymes. Lysine is customarily assayed as the hydrochloride.

When the procedure taught by the Davis article is repeated using acetate and alpha-ketoglutarate, the results are as described, i.e., the l-lysine is found in the yeast proteins but no substantial amount of free l-lysine is found in the yeast cell apart from the lysine in the proteins themselves. This is in marked contrast to the relatively large amounts of free l-lysine produced when alpha-ketoadipic or alpha-hydroxyadipic acids are reacted with yeast enzymes in the process of the present invention.

While the large amount of free lysine produced by the present invention is far in excess of the lysine found in the yeast proteins, it is not necessary to recover it in pure form. A preferred method of practicing the invention, therefore, involves fermentation by means of yeast of a medium containing a requisite amount of alpha-ketoadipic acid or alpha-hydroxyadipic acid and then recovering the yeast cells which contain the free lysine. In some cases, the whole fermentation mixture may be dried and used as a food supplement.

The conditions under which the reaction of the present invention operates are very definite. The pH range must be between 2.5 and 8.5; for optimal results between 3 and 6 for resting cells and 4.5 to 6 for growing cells. The temperature must not be below 5° C. nor above 50° C.

Another method of carrying out the invention is to rupture yeast cells to set free the enzymes and allow the enzymes to react with alpha-ketoadipic acid or alpha-hydroxyadipic acid without the presence of growing yeast.

The invention is not limited to a particular theory of the exact mechanism which takes place. The facts are that alpha-ketoadipic acid and alpha-hydroxyadipic acid are converted into l-lysine by an asymmetric biosynthesis in excellent yields by the action of yeast enzymes.

It is an advantage of the present invention that any ordinary fermentation medium may be used to which the requisite amounts of alpha-ketoadipic acid or alpha-hydroxyadipic acid have been added. These amounts must be at least 0.3 mg./ml. Smaller concentrations do not give useful products. For best results, somewhat larger amounts are desirable up to as much as 10 mg./ml. Larger concentrations may be used but the efficiency does not increase significantly beyond 10 mg./ml. The optimal amounts will vary somewhat with the materials used and the reaction conditions.

The invention will be described in greater detail in conjunction with the following specific examples in which various yeasts are used to ferment various media. In the examples, ketoadipic acid is sometimes abbreviated KAA. In giving l-lysine concentrations, the concentrations are usually expressed as micrograms, usually abbreviated γ. Also the two principle fermentation media, corn steep liquor and synthetic medium, which will be described below in Example 1, are sometimes abbreviated CSL and Syn, respectively.

EXAMPLE 1

A synthetic medium was prepared with the following components:

Table

| Ingredient | Synthetic medium, grams per liter final strength medium |
|---|---|
| Dextrose | 50 |
| KH$_2$PO$_4$ | 0.3 |
| MgSO$_4$ | 0.1 |
| Aspartic acid | 0.2 |
| Glutamic acid | 0.2 |
| (NH$_4$)$_2$SO$_4$ | 3.8 |
| Sodium citrate buffer [1] | ml. 50 |
| Vitamin solution [2] | ml. 10 |
| Water to 1 liter. | |

[1] Sodium Citrate Buffer:

| | Mg. |
|---|---|
| Sodium citrate | 100 |
| Citric acid | 20 |
| Water to 1 liter. | |

[2] Vitamin Solution:

| | Grams |
|---|---|
| Thiamin | 20.0 |
| Biotin | 0.2 |
| Pyridoxine | 20.0 |
| Calcium pantothenate | 20.0 |
| Inositol | 200.0 |
| Nicotinic acid | 20.0 |
| Water to 40 ml. | |

Fifteen-milliliter portions of the synthetic medium were placed in 125-milliliter Erlenmeyer flasks. A number of such flasks were prepared, some containing in addition varying amounts of alpha-ketoadipic acid. These flasks were plugged with cotton and sterilized in an autoclave for 15 minutes at 15 pounds steam pressure. Malt-agar slants carrying 24- to 28-hour cultures of growing yeast cells (*Saccharomyces cereviseae*) were suspended in 10 milliliters of sterile physiological saline. 0.3 milliliter of this suspension was used to inoculate the sterile Erlenmeyer flasks. The flasks, plugged with cotton, were then incubated for 72 hours at about 24° C. on a reciprocal shaker. At the end of the fermentation period, the flasks were steamed for ten minutes in an open autoclave to stop the fermentation. The contents of the flask were centrifuged and the supernatant liquor recovered and analyzed for its l-lysine content by a microbiological method described by Steel et al. in the Journal of Biological Chemistry, 177, page 533 (1949). The results of this series of fermentations are shown in the table below.

Another series of fermentations using a medium composed of 50 grams of dextrose, 3.8 grams of ammonium sulfate and 50 milliliters of corn steep liquor (50% solids dry basis) per liter and adjusted to pH 5.3 with phosphoric acid were run in the same manner. The results of this series of fermentations are also shown in the following table.

Table

LYSINE PRODUCTION FROM KAA BY YEASTS GROWN IN SYNTHETIC MEDIUM OR CORNSTEEP LIQUOR MEDIUM

| KAA Added, mg./ml. | Synthetic Medium | | Cornsteep Liquor Medium | |
|---|---|---|---|---|
| | γ/ml. | Percent Conversion | γ/ml. | Percent Conversion |
| None | 45 | | 200 | |
| 0.3 | 265 | 88 | | |
| 0.6 | 500 | 83 | | |
| 1.0 | 558 | 56 | | |
| 3.0 | 833 | 27 | | |
| 5.0 | 324 | 5.4 | 4,210 | 84 |
| 10.0 | | | 4,210 | 42 |
| Zero time assay | | | 400 | |

As will be seen from these results, the alpha-ketoadipic acid was converted to the extent of 88% in the synthetic medium when the level of acid was 0.3 milligram per milliliter of fermentation and as high as 84% in the corn steep liquor medium at levels of 5 milligrams of alpha-ketoadipic acid. As will also be seen, the production of lysine is considerably increased over that which is obtained without the use of the ketoadipic acid as a precursor, thus showing the conversion of the alpha-ketoadipic acid to lysine as a result of the fermentation.

EXAMPLE 2

A series of fermentations was conducted using the same fermentation media as were used in the preceding example and under the same conditions, the only difference being in the species of yeast cells used to inoculate the fermentation media. The results of these fermentations are shown in the following table.

Table

| Yeast Culture | Medium | KAA, mg./ml. | Net Lysine Yield, mg./ml. |
|---|---|---|---|
| Red Star Bakers Yeast: | | | |
| *Saccharomyces cereviseae* | CSL | None | 0 |
| Do | CSL | 1 mg | 1.16 |
| Do | CSL | 5 mg | 2.58 |
| Fleischman's Bakers Yeast: | | | |
| *Saccharomyces cereviseae* | CSL | None | 0 |
| Do | CSL | 5 mg | 3.52 |
| *Saccharomyces ellipsoideus* | Syn | None | 0 |
| Do | Syn | 1 mg | 0.093 |
| *Saccharomyces thermantitonium* | Syn | None | 0 |
| Do | Syn | 1 mg | 0.111 |
| *Saccharomyces turbideus* | Syn | None | 0 |
| Do | Syn | 1 mg | 0.175 |
| *Saccharomyces pastorianus* | Syn | None | 0 |
| Do | Syn | 1 mg | 0.155 |

In another series of fermentations conducted in the same manner, other species of Saccharomyces including *Saccharomyces aromaticus*, *Saccharomyces spiritus*, and *Saccharomyces logos* also converted alpha-ketoadipic acid to lysine in significant amounts.

EXAMPLE 3

The ability of yeast cells of a different family to convert alpha-ketoadipic acid to lysine was demonstrated in fermentations in which several species of Torulopsis were used. This ability was demonstrated in both synthetic and corn steep liquor media as described in Example 1. The fermentation medium contained different amounts of alpha-ketoadipic acid. The results of this study are shown in the following table.

Table

| Yeast Culture | Medium | Precursor, mg./ml. | Net Lysine, mg./ml. |
|---|---|---|---|
| *Torulopsis utilis*: | | | |
| NRRL Strain Y-900 | CSL | None | 0 |
| Do | CSL | 5 mg | 3.70 |
| *Torulopsis utilis*: | | | |
| NRRL Strain 1082 | CSL | None | 0 |
| Do | CSL | 5 mg | 3.76 |
| *Torulopsis utilis*: | | | |
| NRRL Strain 1084 | CSL | None | 0 |
| Do | CSL | 5 mg | 3.18 |
| *Torulopsis cremoris* | Syn | None | 0.07 |
| Do | Syn | 1 mg | 0.37 |
| *Torulopsis sphaerica* | Syn | None | 0.04 |
| Do | Syn | 1 mg | 0.68 |

In additional experiments using yeast cells of this same Cryptococcaceae family, it was found that yeasts of other genera including the species *Rhodotorula glutinis* and *Canadida lipolytica* also had the ability to convert alpha-ketoadipic acid to lysine in the same kind of fermentation and under the same conditions as described above. Still other experiments indicate that species of other genera such as Kloeckeria can convert alpha-ketoadipic acid to lysine in a fermentation process such as is described herein in significant amounts.

EXAMPLE 4

Numerous species of genera of the family Endomycetaceae were also examined for their ability to produce lysine from alpha-ketoadipic acid as a precursor. These experiments were conducted with different nutrient substrates but were otherwise similar to the fermentations described above.

In one such series of experiments, the fermentation medium contained as nutrient elements 2% molasses and 3% malt extract. After 72 hours fermentation, the mash was heated with steam in 100° C. for ten minutes to stop the fermentation and rupture the yeast cells. The supernatant liquor was then analyzed for lysine with the following results:

Table

| Yeast Culture | Net Lysine, γ/ml. | |
|---|---|---|
| | No Precursor | 5 mg./ml. KAA |
| Endomyces sp. | 0 | 340 |
| Nematospora phaseoli | 0 | 419 |
| Endomycopsis fibuliger | 0 | 471 |
| Saccharomycodes ludwigii | 0 | 299 |
| Schizosaccharomyces pombe | 0 | 872 |
| Schwanniomyces occidentalis | 0 | 479 |

In another series of fermentations, the fermentation medium contained 0.4% yeast extract, 0.4% glucose and 1.0% of malt extract. The results are shown below:

Table

| Yeast Culture | Net Lysine, γ/ml. | |
|---|---|---|
| | No Precursor | 5 mg./ml. KAA |
| Nematospora phaseoli | 0 | 646 |
| Endomycopsis fibuliger | 0 | 76 |
| Saccharomycodes ludwigii | 0 | 103 |
| Schizosaccharomyces pombe | 0 | 551 |

EXAMPLE 5

Fifteen milliliters of nutrient medium as described in Example 1 was placed in a 125-milliliter flask and sterilized in an autoclave. After cooling, the contents of the flask were inoculated with several pellets of Fleischmann's active dry yeast (*Saccharomyces cereviseae*) obtained from a grocery store. The flask was placed on a reciprocal shaker and the yeast allowed to grow for 72 hours at 24° C.

An aliquot of the yeast culture was removed and diluted with sterile saline to 100,000 fold. One milliliter of this dilution was added to a test tube containing 15 milliliters of the nutrient medium of Example 1 which also contained 1.5% of agar, the contents of the tube having been autoclaved and cooled to 45° C. The contents of the tube were well mixed and poured into a sterile petri dish and the dish incubated at 24° C. until discrete colonies of yeast cells were obtained. Several of these colonies were examined microscopically and found to be pure cultures of *Saccharomyces cereviseae*. Cells from such colonies were transferred with a sterile needle to agar slants made up of 2% cane molasses, 3% malt extract and 2% agar. These slants were incubated at 37° C. for 24 hours and the surface growth was washed off with 10 milliliters of sterile physiological saline. This suspension was used to inoculate a medium for the production of lysine from alpha-ketoadipic acid.

A medium composed of 5% cerelose, 5% corn steep liquor, 0.5% ammonium sulfate and adjusted to pH 5.3 with ammonium hydroxide was prepared. To a series of 125-milliliter Erlenmeyer flasks was added 15 milliliters of the sterile fermentation medium just described.

To another series of similar flasks, sterile medium and an amount of alpha-ketoadipic acid of 5 milligrams per milliliter of medium was added. The flasks were grown for 72 hours at 24° C. The contents of the flasks were then pooled, centrifuged and the supernatant liquor assayed microbiologically for lysine. In the series which contained no added alpha-ketoadipic acid, there was found 83 micrograms of l-lysine per milliliter, whereas in the fermented liquor containing the added alpha-ketoadipic acid, there was found 193 micrograms per milliliter of l-lysine in the supernatant.

The yeast cells from each group of flasks were resuspended in distilled water and frozen and dried under vacuum. The dry weight of the yeast cells grown without alpha-ketoadipic acid was 16.0 grams per liter, whereas with the added alpha-ketoadipic acid, the weight was 17.3 grams per liter. Two hundred fifty-milligram portions of the lyophilized yeast cells were autoclaved in 15 milliliters of distilled water for ten minutes at 15 pound pressure, cooled to room temperature and centrifuged. The supernatant liquid was then assayed microbiologically for lysine. It was found that the yeast cells grown in the medium without alpha-ketoadipic acid contained 1.2% by weight of lysine whereas the yeast cells grown with alpha-ketoadipic acid contained 19.5% of free l-lysine.

The yeast residues remaining after the autoclaving extraction procedure were heated with 6 milliliters of 2.5 N hydrochloric acid for twelve hours at 15 pounds pressure. The suspensions were then cooled, clarified by filtration, neutralized with sodium bicarbonate and assayed microbiologically for l-lysine. It was found that the yeast cells grown without alpha-ketoadipic acid contain 3.2% lysine bound in protein form, whereas those yeast cells grown with alpha-ketoadipic acid contained 3.9% of lysine in protein form.

This series of experiments indicates that the addition of alpha-ketoadipic acid to the fermentation medium fermented with yeast had no appreciable effect on the total weight of yeast developed during the fermentation period—and had no appreciable effect on the protein content of the cells insofar as the lysine component of the protein matter is concerned. On the other hand, the addition of alpha-ketoadipic acid has a profound effect upon the development of l-lysine in free form in the yeast cell and in the aqueous medium in which they were grown.

EXAMPLE 6

About 200 grams of resting yeast cells (*Saccharomyces cereviseae*) obtained from a grocery store and sold under the name Fleischmann's Bakers' Yeast was suspended in 1 liter of water and mixed with 1 liter of a 1.0% aqueous alpha-ketoadipic acid solution. The mixture was buffered to pH 4.5 with 0.1 molar citric acid and sodium hydroxide. The supernatant liquor and a sample of ruptured yeast cells were examined for free lysine. No lysine was found. The suspension containing the resting cells was then placed in a vessel and air passed through the solution at the rate of 15 liters per minute for 23 hours at room temperature. At the end of this time, the yeast cells were found to contain 2.4 grams of free lysine.

EXAMPLE 7

The above procedure was repeated using the same and lower concentrations of aqueous solutions of alpha-ketoadipic acid. The pH's of the aqueous yeast suspensions were initially adjusted within the range from 3.0 to 8.5. In every case a portion of the alpha-ketoadipic acid was converted into free l-lysine. Optimum results were obtained within the pH range of 3.0 to 5.0. Under the conditions used, yeast products containing 5%, 7%, 9% and 11% of free l-lysine are obtainable.

EXAMPLE 8

A fermentation medium composed of 40 milliliters of cane molasses, 2 grams of $KH_2PO_4$, 2 grams of urea and 40 milliliters of corn steep liquor diluted one to three with water and the whole brought up to 2 liters of water was prepared and sterilized. This medium was placed in a stainless steel experimental yeast fermentor equipped with baffles, a stirrer and an air sparger. The Use of Amylolytic Yeasts for the Production of a Nutritional Product, Ph. D. thesis of Calvin Keuhner, Library, The Ohio State University, Columbus, Ohio. The medium was inoculated with 150 milliliters of a 24-hour culture of *Torulopsis utilis* grown in a molasses and malt extract medium. A second fermentor was prepared in the same manner except that alpha-ketoadipic acid was added at the rate of 2 grams per liter of fermentation medium. On examination of the inoculated tanks, it was found that the medium without the added alpha-ketoadipic acid contained 35 gammas per milliliter of 1-lysine and $1 \times 10^8$ yeast cells per milliliter. The fermentor with the added alpha-ketoadipic acid contained 34 gammas per milliliter of lysine and $1.2 \times 10^8$ yeast cells per milliliter. The contents of the tank were allowed to ferment for twelve and one half hours at 30° C. with stirring and aeration at the rate of one volume of air per minute. At the end of that time, the contents of the tanks were again examined and in the case of the fermentation without alpha-ketoadipic acid, there was 45 gammas per milliliter of 1-lysine and $4.4 \times 10^9$ yeast cells per milliliter. On the other hand, the fermentor with the alpha-ketoadipic acid contained 349 gammas per milliliter of 1-lysine and $4.1 \times 10^9$ yeast cells per milliliter.

Although one of the principal advantages of the present invention lies in the fact that the whole fermented mash from the fermentation may be added directly, with drying if desired, to animal feeds to bring their lysine content into balance or the separated yeast cells may be used to supplement lysine-deficient foods for man and beast, it may be desirable to recover essentially pure lysine from the fermented product. The l-lysine content of the fermented liquor may be recovered in known manner. An effective way involves the use of ion-exchange resins which have an affinity for amino acids. Aqueous liquors containing l-lysine, whether it be the supernatant liquor from the fermentor or hydrolyzed yeast cells containing free lysine, is adsorbed on an appropriate ion-exchange resin and thereafter eluted and the eluate refined to obtain essentially pure l-lysine.

EXAMPLE 9

Ten grams of *Saccharomyces cereviseae* (Bakers' Yeast) and 400 mg. DL-alpha-hydroxyadipic acid were dispersed in 90 ml. water. A series of four tests was made at different pH's. In each case, 10 ml. were used in a 125 ml. Erlenmeyer flask, incubation being with vigorous shaking at 30° C. for 18 hours. The following table shows the results, giving net l-lysine yields, that is to say after subtracting the lysine present in the yeast cells at zero time.

Table

| Starting pH | 3.5 | 4.5 | 5.5 |
|---|---|---|---|
| Net l-lysine synthesis γ/ml. | | | |
| | 312 | 187 | 75 |

It will be noted that good yields of lysine were obtained, the optimum being at a pH of 3.5.

EXAMPLE 10

This test was carried out as described in Example 9 but all portions were incubated at pH 3.5. However, various amounts of alpha-hydroxyadipic acid were used. The results are shown in the following table. In each case, the alpha-hydroxyadipic acid was in the form of a stock solution adjusted to pH 3.5 before addition.

Table

| Alpha-hydroxyadipic acid/ml.: | Net γ l-lysine/ml. |
|---|---|
| 0 | 0 |
| 2 mg. DL-alpha-hydroxyadipic acid | 287 |
| 4 mg. DL-alpha-hydroxyadipic acid | 362 |

EXAMPLE 11

The procedure of Example 10 was repeated using duplicate tests at each level of alpha-hydroxyadipic acid addition. The results are shown in the following table.

Table

| Addition, mg./ml.: | Net l-lysine γ/ml. |
|---|---|
| 0 | 0 |
| 2.5 | 315, 325 |
| 5 | 470, 437 |
| 10 | 595, 558 |

It will be noted that alpha-hydroxyadipic acid operates best with somewhat larger minimum concentrations than can be used in some cases with ketoadipic acid. This may be due to the fact that the alpha-hydroxyadipic acid was a racemic compound.

EXAMPLE 12

The effectiveness of alpha-hydroxyadipic acid was tested on active fermentation in two media with two types of yeast. One medium was a synthetic medium described in Example 1, the other a corn steep liquor medium containing 5% glucose, 5% corn steep liquor and 0.5 ammonium sulfate. The pH was 5.5 and each batch was 10 ml. in 125 ml. flask. Inoculum was 0.2 ml. per flask and incubation with shaking for 72 hours at 30° C. The results are shown in the following table with various amounts of alpha-hydroxyadipic acid.

Table

| | Media | Mg. DL-α-Hydroxy Adipic Acid per ml. | Net l-lysine, γ/ml. |
|---|---|---|---|
| *Saccharomyces cereviseae* Y-80 | CSL | 0 | 0 |
| | CSL | 2 | 293 |
| | CSL | 5 | 348 |
| | CSL | 10 | 411 |
| | Syn | 0 | 0 |
| | Syn | 2 | 78 |
| | Syn | 5 | 62 |
| | Syn | 10 | 179 |
| *Torula utilis* Y-900 | CSL | 0 | 0 |
| | CSL | 2 | 466 |
| | CSL | 5 | 516 |
| | CSL | 10 | 492 |
| | Syn | 0 | 0 |
| | Syn | 2 | 87 |
| | Syn | 5 | 135 |
| | Syn | 10 | 201 |

EXAMPLE 13

The effectiveness of the new high lysine-containing yeasts of the present invention in promoting the growth of baby chicks fed on lysine deficient diets was demonstrated in the following manner.

A high lysine-containing yeast was prepared by fermenting with a culture of *Saccharomyces cereviseae* 3 liters of a medium containing 5% by volume corn steep liquor, 0.5% by weight of ammonium sulfate, 5% by weight of Cerelose, and 0.5% by weight of alhapa-ketoadipic acid. The pH of the fermentation medium was adjusted to 5.3 and dispensed in flasks and sterilized for 15 minutes at 15 pounds pressure. The flasks were then incubated at 24° C. for 72 hours on a reciprocal shaker. An aliquot of the steamed fermented medium showed that the liquor contained 2.29 milligrams of lysine per milliliter. The remainder of the fermented liquor was centrifuged and the yeast cells recovered and suspended in 1.5 liters of water and then vacuum dried at 50° C. for two days. The dried yeast cells were then ground to a fine powder weighing 54 grams and containing 6.87 grams of free l-lysine.

Another preparation was made in the same manner except that the alpha-ketoadipic acid was omitted from the nutrient medium. The 54 grams of dried yeast product which was recovered contained 0.54 grams of free l-lysine.

One-day-old Silver Cross chicks were divided into groups of twelve and placed in an electrically heated brooder in an air-conditioned room at 28° C. A diet low in lysine but otherwise adequate for chick growth was prepared of the following composition:

| | Percent |
|---|---|
| Yellow corn, fine ground | 10.0 |
| Sesame meal | 15.0 |
| Cottonseed meal | 15.0 |
| Cerelose | 3.0 |
| Steamed bone meal | 2.0 |
| Mineral salts | 2.0 |
| CaCO$_3$ | 1.0 |
| Vitamins mixed with Cerelose | 1.0 |
| Vitamins A, D, and E in corn oil | 1.0 |
| Choline chloride | 0.2 |

One group of twelve chicks was fed ad libitum the lowered lysine diet just described. Another group of twelve chicks was fed the low lysine diet supplemented with the low lysine yeast product. Another group of twelve chicks was fed the low lysine diet supplemented with the high lysine yeast product described above and a fourth group of chicks was fed the low lysine diet supplemented with 4 grams of l-lysine per kilogram of diet. The chicks were weighed periodically. The results of these feeding tests are shown in the following table.

*Table*

| Lysine Supplement Fed | Weight, Chicks grams | | | |
|---|---|---|---|---|
| | 5 days | 7 days | 11 days | 13 days |
| None | 54 | 59 | 75 | 81 |
| 27 g./kg. low-lysine yeast | 56 | 61 | 83 | 90 |
| 27 g./kg. high-lysine yeast | 62 | 73 | 103 | 115 |
| 4 g./kg. l-lysine | 63 | 75 | 111 | 126 |

As will be seen from the above results, the baby chicks gained more weight with the low-lysine yeast supplemented diet than they did on the lysine-free diet. However, they gained considerably more weight in the experimental period on the diet containing the high-lysine yeast product prepared by the fermentation process described above. These results clearly indicate that the new yeast product of the present invention is a valuable aid to nutrition.

The yeast cells which have been in contact with alpha-ketoadipic acid are characterized by having an extremely high content of l-lysine, 10% and more, and appear to be a new form of yeast because of this high free l-lysine. This property makes these yeast cells of particular value in supplementing low lysine foods derived from such cereals as corn, wheat and rice. For instance, wheat flour is low in l-lysine; and the addition of amounts of lysine up to about 0.4% by weight has been recommended. This is easily accomplished by adding approximately 4% by weight, dry basis, of yeast cells containing 10% free lysine. Of course, when the yeast cells contain larger amounts as have been indicated hereinabove, the amount of yeast that need be added may be considerably reduced.

The amount of free lysine in the yeast cells can be governed by the amount of the alpha-ketoadipic acid that is added to the fermentation which produced the yeast cells. Larger amounts of KAA added to the fermentation—that is, amounts up to 2%—result in higher contents of free l-lysine in the yeast cells and in the fermentation medium from where there may be isolated independently the free l-lysine and protein-bound lysine in the yeast cells. Our invention contemplates, therefore, the use of amounts of precursor as high as 2% by weight in the process.

This application is, in part, a continuation of our co-pending application Serial No. 802,659, filed March 30, 1959, now abandoned, which in turn was a continuation-in-part of our application Serial No. 679,060, filed August 19, 1957, now abandoned.

We claim:

1. A method of preparing l-lysine which comprises the step of subjecting an acid selected from the group consisting of alpha-ketoadipic acid and alpha-hydroxyadipic acid in an amount of at least 0.3 mg./ml. and not more than 10 mg./ml. to the action of the enzymes of yeast at a pH between 2.0 and 5.0 and at a temperature between 5° C. and 50° C.

2. A method according to claim 1 in which the acids are contacted with yeast cells containing the enzymes in the cells.

3. A method according to claim 2 in which the yeast cells are contacted with a fermentation medium under aerobic fermentation conditions.

4. A method of preparing l-lysine which comprises the step of subjecting alpha-ketoadipic acid in an amount of at least 0.3 mg./ml. to the action of the enzymes of yeast at a pH between 2.0 and 5.0 and at a temperature between 5° C. and 50° C.

5. A method of preparing l-lysine which comprises the step of bringing alpha-ketoadipic acid in an amount of at least 0.3 mg./ml. and not more than 10 mg./ml. into contact with yeast cells at a pH between 2.0 and 5.0 and at a temperature between 5° C. and 50° C. for a period of at least one hour whereby the alpha-ketoadipic acid is converted to l-lysine.

6. A method of preparing l-lysine which comprises the step of adding alpha-ketoadipic acid in an amount of at least 0.3 mg./ml. and not more than 10 mg./ml. to an aerobic yeast fermentation.

7. A method of producing l-lysine which comprises the step of subjecting alpha-ketoadipic acid in an amount of at least 0.3 mg./ml. and not more than 10 mg./ml. to the action of yeast cells at a pH between 2.0 and 5.0 and at a temperature between 5° C. and 50° C. of the genus Saccharomyces.

8. A method of preparing l-lysine which comprises subjecting the alpha-ketoadipic acid in an amount of at least 0.3 mg./ml. and not more than 10 mg./ml. to the action of yeast cells at a pH between 2.0 and 5.0 and at a temperature between 5° C. and 50° C. of the species *Saccharomyces cereviseae*.

9. A method of preparing l-lysine which comprises the step of subjecting alpha-ketoadipic acid in an amount of at least 0.3 mg./ml. and not more than 10 mg./ml. to the action of yeast cells at a pH between 2.0 and 5.0 and at a temperature between 5° C. and 50° C. of the genus Torulopsis.

10. The process in accordance with claim 9 in which the yeast cells are *Torulopsis utilis*.

(References on following page)

References Cited in the file of this patent

Advances in Enzymology, vol. 16, 1955, pp. 295–304, Interscience Publishers Inc., New York.

Annual Review of Biochemistry, vol. 24, 1955, pp. 284–285.

Journal of Biological Chemistry, vol. 213, 1955, pp. 355–363.

Meister: Biochemistry of Amino Acids, February 1957, pp. 359–361, Academic Press Inc., New York.

Journal American Chemical Society, vol. 75, 1953, pp. 1680–1684.

Freeland et al.: Biochemical Journal, vol. 41, pages 135 to 138, London, 1947.

Cook: Chemistry and Biology of Yeast, pages 167 to 170, Academic Press, New York, 1958.